United States Patent
Boissevain

(10) Patent No.: US 6,810,945 B1
(45) Date of Patent: Nov. 2, 2004

(54) CONDITIONING THE AIR IN A STRUCTURE UTILIZING A GRAVEL HEAT EXCHANGER UNDERNEATH THE SLAB

(76) Inventor: Mat Boissevain, 741 Brookside La., Sierra Madre, CA (US) 91024

( * ) Notice: Subject to any disclaimer, the term of this patent is extended or adjusted under 35 U.S.C. 154(b) by 0 days.

(21) Appl. No.: 10/426,340

(22) Filed: Apr. 29, 2003

(51) Int. Cl.[7] ................................. F28D 7/00
(52) U.S. Cl. .......................... 165/45; 62/260
(58) Field of Search ................ 165/45; 62/266

(56) References Cited

U.S. PATENT DOCUMENTS

| | | | | |
|---|---|---|---|---|
| 4,051,891 A | * | 10/1977 | Harrison | 165/54 |
| 4,127,973 A | * | 12/1978 | Kachadorian | 52/169.11 |
| 4,323,113 A | * | 4/1982 | Troyer | 165/45 |
| 4,498,526 A | * | 2/1985 | Arenas | 165/45 |
| 4,674,561 A | * | 6/1987 | Kelley | 165/45 |
| 5,842,919 A | * | 12/1998 | Lyons et al. | 454/336 |
| 6,293,120 B1 | * | 9/2001 | Hashimoto | 62/260 |

* cited by examiner

Primary Examiner—Terrell McKinnon
(74) Attorney, Agent, or Firm—Donald D. Mon

(57) ABSTRACT

A conditioner for the air in a structure which includes a gravel body beneath a building slab. The gravel is in thermal contact with the earth beneath the slab. The earth is a cold-sink which exchanges heat with the gravel body and thereby with air which is forced through the gravel.

5 Claims, 3 Drawing Sheets

CONDITIONING THE AIR IN A STRUCTURE UTILIZING A GRAVEL HEAT EXCHANGER UNDERNEATH THE SLAB

FIELD OF THE INVENTION

Conditioning the air inside a structure utilizing a gravel heat exchanger underneath the building's foundation slab.

BACKGROUND OF THE INVENTION

Conditioning the air inside of a building structure generally involves lowering the temperature of air which is being recycled in the building, or of air which is drawn in from the outside. Conventional air conditioners utilize either evaporative or mechanical refrigeration for this purpose.

The well-known "swamp cooler" is the most frequently encountered example of an evaporative type. Air to be cooled is passed through a mat of fibrous material over which a stream of water is pumped. The cooling effect is accompanied by a rise in humidity, a trade-off that is acceptable when cost of the system and its operations are a serious concern. It will not perform well in hot, humid regions such as in the Southern United States.

Mechanical refrigeration is usually preferred when it is affordable. The system itself is expensive, and energy to operate it is a significant continuing cost. In the operation of this type of system, the apparatus provides a substantial thermal gradient, so the volume through-put of air is often reduced, because reduction of temperature in a large room can be achieved with the introduction of a relatively small volume of very cold air.

This invention proposes the employment of a gravel heat exchanger placed beneath the foundation slab of the building. The gravel is in thermal (not necessarily direct) contact with the earth beneath it. The earth acts as a cold sink as will be explained below. Air to be conditioned is passed through the bed of gravel on its way to the interior of the building, and is cooled by heat-exchange contact with the gravel, passing through the interstitial spaces between the granules.

It is insufficiently recognized that except in very cold or excessively hot dry climes, the temperature of the earth even only a few inches deep under a shaded area is remarkably and reliably cool, and is capable of substantially maintaining its cool temperature even as it cools down the air above it, Accordingly, the earth beneath the gravel heat exchanger may be considered to be a "cold sink".

The temperature of this cold sink is usually 50–60 degrees F., which is only a modest but significant number of degrees below the usual temperatures to be reduced usually between 85 degrees F. and 120 degrees F. One immediately notices that the temperature of the cooled air often flowing through the gravel cold sink is only about 8 degrees F. higher than the 50 degrees to 60 degrees temperature of the cold sink. This is a modest gradient compared to the large gradient between the coldest temperature of the mechanical refrigerator and the same gases. It is also evident that, while a mechanical system can reduce the temperature to very low values, this invention cannot reduce it below the temperature of the cold sink.

Still upon reflection, humans are most comfortable in air above 60 degrees F., often about 78 degrees F. with modest humidity. Thus, a system whose lowest temperature reached is on the order of 70 degrees F., can still readily provide for cooling of air to temperatures in the range between about 60 degrees F. and 80 degrees F., if the air flow is increased accordingly. This is a very livable temperature range, and includes the optimum temperatures.

Basically, in this invention, this means moving air through the heat exchanger in quantities sufficient to cool the total air in the structure to the desired lower temperature. By way of example, it is estimated that the gravel heat exchanger of this invention can provide on a continuing basis about 20 watts of cooling power per square foot of earth surface. With a throughput of sufficient air, the air in the structure can in a suitably short time approach the temperature of the heat sink. Generally it will settle at about 7 degrees to 9 degrees F. above that temperature, resulting in a very livable room.

Accordingly, with the use of this invention, a greater volume of air must be moved through the heat exchanger to attain the desired lowered temperature. Here is where the only cost of operation arises—the blower must force more air through the system than if the heat exchanger provided a significantly lower temperature gradient. The product of the air volume times the temperature rise must be the same for equal performance of the system. Fortunately much less energy is needed to force a stream of air through a system than to chill a body of gas in a mechanical refrigerator with the use of a gas compressor.

There is no energy expended in this process to cool the air. The only energy required is that of a blower to force the air through the heat exchanger, and this is minor compared to refrigeration costs.

The cost of the system is very affordable, requiring only clean gravel, interstitial channels in the gravel, and minor structural provisions which are made when the slab is prepared and the concrete is poured.

It is best practice to provide fine filtration of air which enters the building to assure a pure air supply. In addition, this system will cause the pressure in the building to be positive relative to the outside ambient pressure. With such a relationship, adverse material will not flow into the structure from the outside because the tendency at all structural leaks and openings is to flow outwardly. In dusty, microbial and explosive environments, this is an important safety feature. One inch of water pressure is usually adequate and readily reached.

Accordingly it is an object of this invention to provide a conditioning system which is readily and economically built, which has an extended life without maintenance other than to change or wash a filter from time to time, and which can be economically operated.

BRIEF DESCRIPTION OF THE INVENTION

A conditioning system according to this invention is intended to be disposed below grade, preferably beneath a poured concrete foundation slab. While it can at least theoretically be installed beneath an existing slab, the work involved would be quite expensive. This invention is principally intended to be part of the initial construction, when its components can be constructed without impediment from existing structure.

It is installed in thermal contact with earth beneath it. This does not require direct contact with the earth, although it may. The preferred embodiment utilizes a thermally conductive and gas-impermeable blanket that is placed on the surface of the earth to keep the dirt, microbes and odor from entering the system. The surface of the earth provides a heat transfer surface whose temperature is responsive to that of the earth beneath it.

A gravel heat exchanger is laid on the heat transfer surface (or on the blanket atop it). This heat exchanger is a body of gravel having dimensions of depth, width and length. Entry and exit plenums are formed adjacent to edges of this heat exchanger, so that air to be conditioned is forced into and through the width of the exchanger and from it, into an exit plenum to a register or air box (including a filter) discharging into the structure.

Preferably the heat exchanger and the plenums are also shielded from the bottom of the slab, thereby becoming an encapsulated system.

As yet another optional feature, louvers may be provided to by-pass air from the structure, or to control its rate of flow into the structure.

The above and other features of this invention will be fully understood from the following detailed description and the accompanying drawings, in which: BRIEF DESCRIPTION OF THE DRAWINGS FIG. 1 is a plan view, partly in cutaway cross-section, showing the preferred embodiment of the invention;

DETAILED DESCRIPTION OF THE INVENTION

Figure 1:
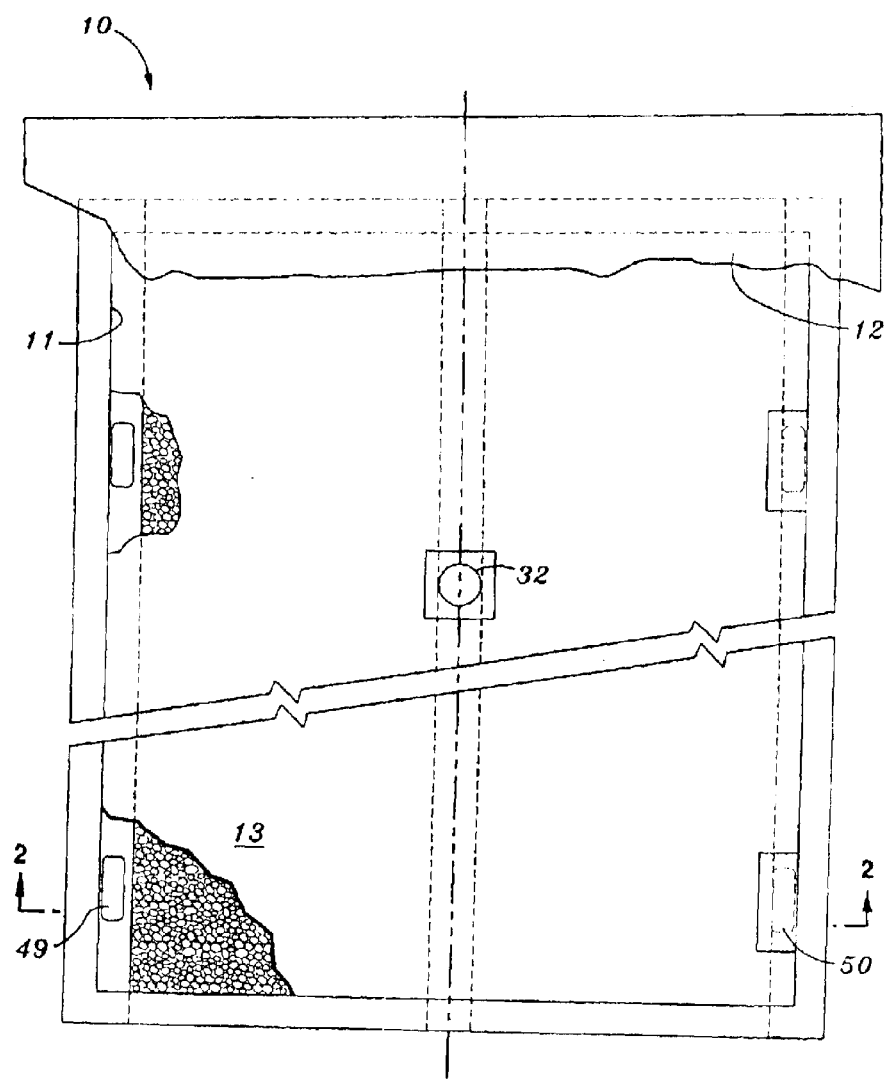
Figure 2:
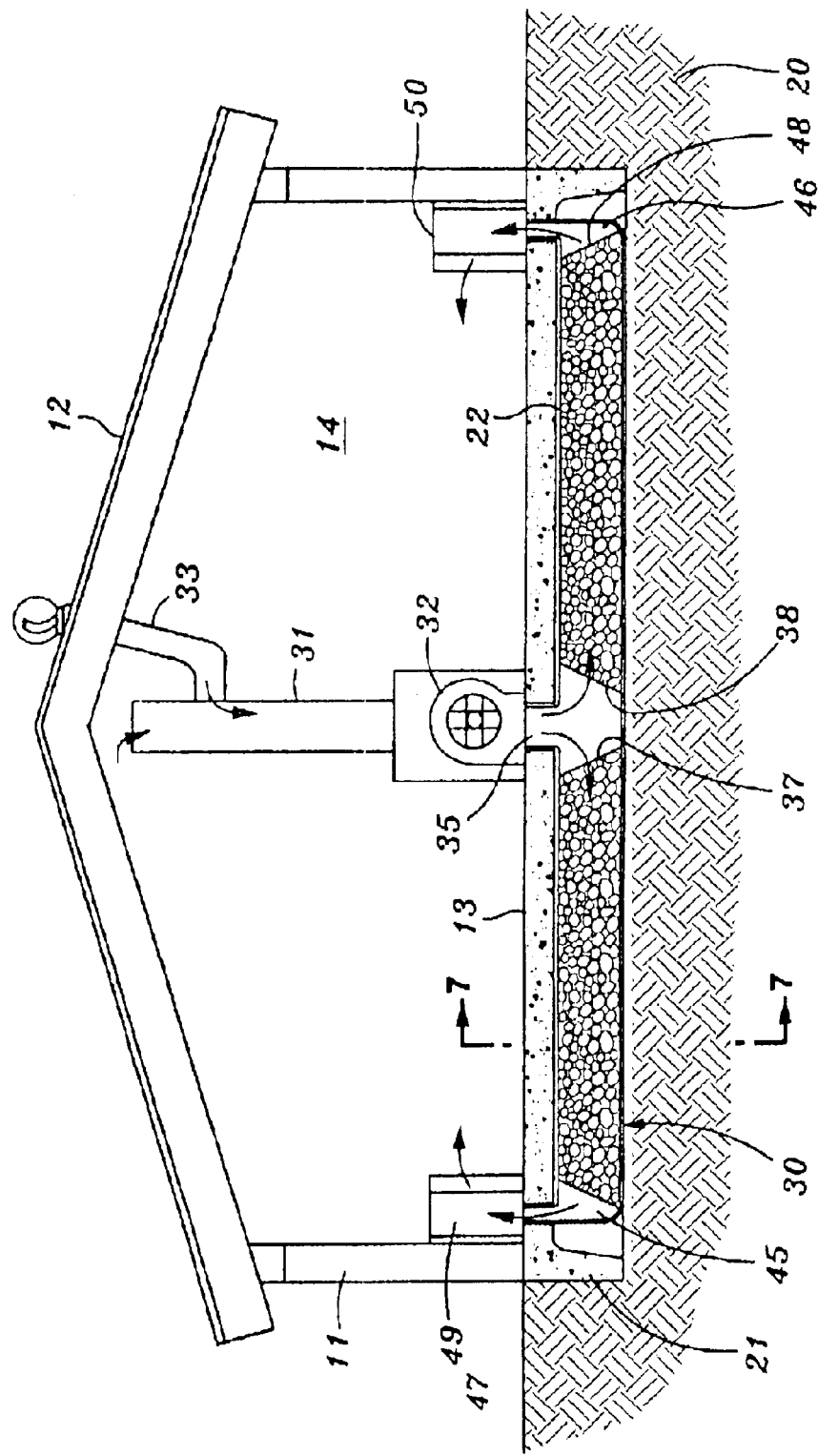
FIG. 2 is a cross-section taken at line 2—2 in FIG. 1.

This invention is carried out in a building 10 of any desired type. Classically such a building will have a peripheral side wall 11 and a roof 12, along with a foundation slab 13. These form an interior region 14 which occupants occupy, and whose air is intended to be conditioned. BY "conditioning" is meant the maintenance of room temperature in an agreeable range. Such a range generally extends between about 65 degrees F. and 85 degrees F. With sufficient air flow, this invention can readily reduce air temperatures into this range.

The building is sited on the ground, based on compacted earth 20 (the "cold sink") over which slab 13 is formed. Such slabs customarily include a stem wall 21 that extends around the perimeter. It can prevent rain water from entering the cold sink region.

The central portion 22 of the slab becomes the floor of the building, usually the region inside the stem wall and under the central portion is earth that supports the slab. In this invention, portions of this region are adapted to accommodate a gravel heat exchanger 30, which will be described in detail below.

The system is intended selectively to condition air already in the structure, or air from the outside, or any combination of them., For this purpose, an inlet conduit 31 opens into the room and extends downward to a blower 32. An outside air inlet 33 extends through the roof and connects to the inlet conduit, there being a damper (not shown) or other means to open or close either, or to open them in various combinations and ratios.

Figure 5:
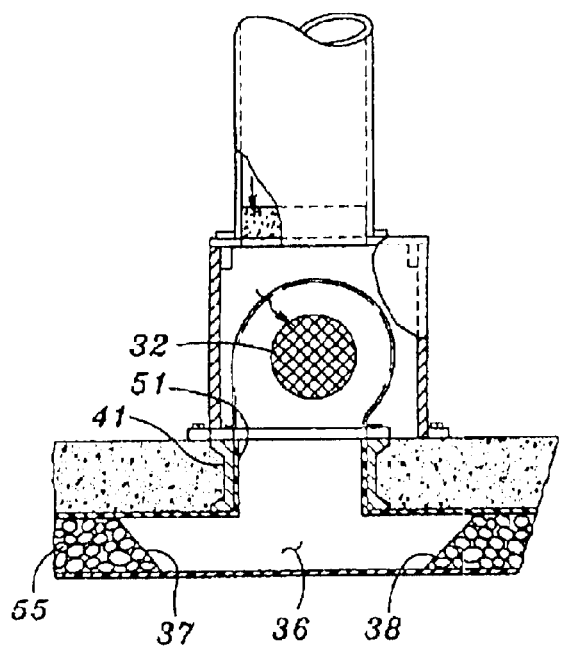
FIG. 5 is a fragmentary, side view, partly in cross-section of another portion of the system.
Figure 6:
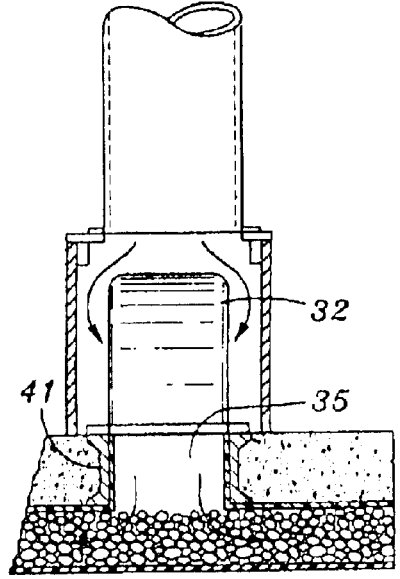
FIG. 6 is a right hand view of FIG. 5.

The blower discharges through an inlet port 35 (FIG. 5) through the slab into an inlet plenum 36. Inlet plenum 36 is in effect an open space beneath the slab extending along edges 37, 38 of the heat exchanger. When the slab was formed, the lower margin of the slab along the plenum was shaped and supported by a rigid sheet 40 of suitable material such as cement board or galvanized steel. This board was supported above the earth as necessary, but extended away from the edge of the plenum by only a limited distance. Inlet port 35 is bounded by a metal collar 41 which was in place when the slab was poured.

Figure 3:
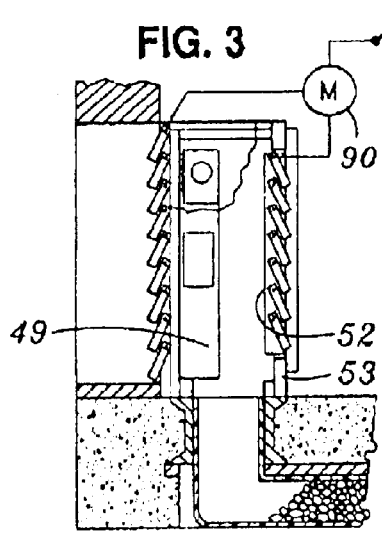
FIG. 3 is a fragmentary side view partly in cross-section of a portion of the system.
Figure 4:
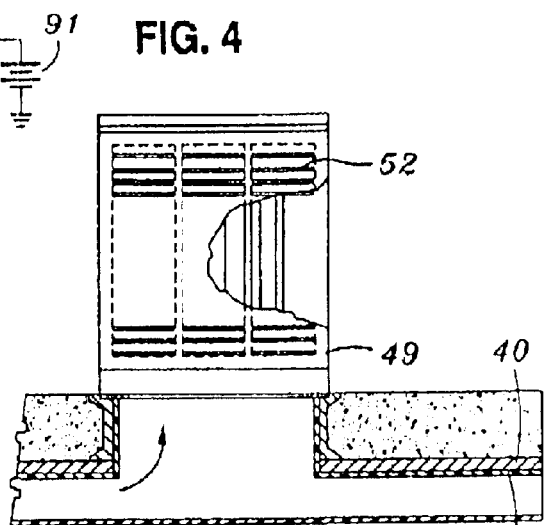
FIG. 4 is a right hand view of FIG. 3.

Outlet plenums 45 and 46 are formed along opposite edges 47,48 of the two sections of the heat exchanger. These gather cooled air that has passed through the heat exchanger. These lead to registers 49,50 in the form of air boxes which rise into the structure. All of them are identical. Each opens into a respective exit port 51 from the respective plenum. As best shown in FIGS. 3 and 4, a filter 52 is fitted into its outlet 53 to remove particulate matter. It is removable for cleaning and replacement.

If desired, a resistance, gas, or oil heater can be fitted into the register outlet to provide for heating on cold days. On cold days, it may transpire that the heat exchanger will raise the temperature of the incoming air instead of cooling it.

The heart of this system is the gravel heat exchanger. As stated above, it is a bed 55 of gravel spread on the ground, preferably on a reasonably thermally conductive bottom liner which is air impermeable so it will exclude moisture, mold, microbes, and odor from the system.

The gravel can be of any size or group of sizes, which when laid down forms a bed with interconnected interstices so that air can flow-from one edge of the bed to the other while contacting the surfaces of the gravel in a heat-exchanger manner.

Extensive investigation has shown that a collection of gravel particles obtained by crushing, which have been cleanly washed, is about ideal. The gravel particles will preferably have passed a screen with apertures somewhat above 1 inch, and retained on a screen about 1 inch.

It is important that there be no significant by-pass passages that would permit air to flow except through the gravel. For this reason, once the gravel bed is placed, the slab must make a reasonably close "fit" with the top surface of the gravel bed.

This could be made by simply pouring the slab concrete onto the gravel bed. However, this would coat some of the gravel. Instead a top liner 56 (FIG. 7) is preferably laid on the gravel, and the concrete poured onto it. This liner will be sufficiently flexible and extensible that when the concrete is poured on it, it will flex to contact the gravel, and will prevent formation of by-pass passages between the gravel pack and the bottom of the slab.

As a further example, top liner 56 may be made of a thermally insulating material, so that heat from the slab will tend to be excluded from the gravel bed, and so that the cooler gravel will not directly cool the slab. This is an optional feature. It need not, but may, extend upwardly into the ports inside the collars.

The gravel layer will optionally be laid in place along with some edge restraint such as a coarse mesh that does not unduly restrict air passage. Any suitable screen or grate will serve. The confinement of the gravel is straight forward.

For reasons which will become evident, it is advantageous to line the heat exchanger and also the plenums with a gas impermeable barrier. A 10 mil sheet of polypropylene will function well for this purpose. While this material does not conduct heat as well as a metal foil, for example aluminum foil, it does resist puncturing and tearing, while conducting heat to a satisfactory extent.

Figure 7:
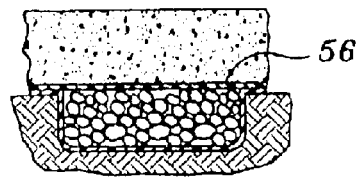
FIG. 7 is a cross-section detail of yet another portion of the system.

In FIG. 7 it will be seen that the bottom and top layers are sealed around the edges so as to surround the gravel from edge to edge of the gravel layer, and to line the bottom, sides and top of the plenums. This system is therefore hermetically separated from the surroundings except through the intake and the registers. The registers open into the building, so the pressure built up by the blower raises the pressure in the building.

The example shows the most effective and economical installation. It provides two heat exchangers, one on each side of an inlet plenum. Instead, some installations may require only one heat exchanger, and then under only a lesser part of the slab. As a practical matter, a flow distance of about 7 feet from entry edge to exit edge is about right for these installations. Longer paths may require more air pressure. Frequently a group of smaller individual exchangers may be preferred for complicated floor plans. It is a matter of design.

For operation after a period of non-use, the blower will be activated. Stagnant air could be admitted to the structure, or diverted outside if preferred. In whatever event, any air flow into the structure must be through the filter so as to exclude microbes and other particulates that may somehow have entered the system.

This system is adaptable to certain operational improvements. For one, as said above, if the system is shut off for an extended time, the air in the heat exchanger may be "stagnant", and acquire a stale scent. It is advantageous to shunt this air to the outside, so the occupants will not sense it. For this purpose a vent aperture 80 (FIG. 5) is formed in the sidewall of the structure, and a set of louvers 81 is placed in it. When the louvers are closed, air can not pass through them. When open, the air in the system will be able to escape through them.

A similar second, set of louvers 85 is formed in the register, Its louvers, when opened, will pass air into the structure. When closed, they will prevent this flow. Essentially the operation of the sets of louvers is alternate. When louvers 81 are open, louvers 85 should be closed. There are, of course, combinations of these, but they would be rare.

A single motor 90 can be operationally connected to both sets oflouvers. It would be powered by a source 91 of electricity through a system 92 that can operate the motor to provide any desired setting of either or both sets. Other arrangements, including mechanical levers can be used instead. For example, only louvers 81 need be controlled provided that louvers 85 were inherently closed when lower pressure caused by opening of louver 81 occurred. Then the alternate situation would occur.

As to the energy requirements, it has been found that a ⅓ HP blower is effective to force about 1080 CFM of air through about a 7 foot path of one inch gravel about 6 inches thick, and if long enough, that this will suffice for nearly all cooling requirements for an insulated structure of about 2500 square feet, with a 9 foot high ceiling. Larger structures will require larger or more blowers and gravel beds.

Should total energy independence be desired, the blower may be solar powered, and it will be most effective on hot days to power the blower.

The reader will recognize that there is no need for internal ducting in the building. All registers simply rise from the floor and the heat exchanger can be shaped in any configuration. This is a substantial cost saving.

The reader will also notice that the blower places the structure under positive pressure relative to ambient. Except through the intake direct from the outside, which may be closed, this system excludes all outside particulates and provides important advantages in dusty or risky environments. In practice, about 5 times the air flow of a refrigeration system is circulated, which enables a higher pressure throughout the structure. This prevents entry of undesirable air borne particles, including microbes.

This invention is not to be limited by the embodiments shown in the drawings and described in the description, which are given by way of example and not of limitation, but only in accordance with the scope of the appended claims.

I claim:

1. In combination with a concrete slab laid above an earthen surface to form the floor of a building above it, said building including a roof and a peripheral sidewall, said slab having a top surface, a bottom surface, an inlet port and an outlet port through said slab from surface to surface spaced apart from one another;

a conditioning system for the air inside the building comprising: between said earthen surface and said bottom surface a body of gravel having an inlet edge and an outlet edge, said edges being separated from one another, said inlet edge being in fluid communication with said inlet port, and said outlet edge being in fluid communication with said outlet port, whereby a fluid path exists from said inlet port through said gravel body to said outlet port;

an air blower discharging air under pressure into said inlet port;

a filter receiving air from said outlet port and filtering said air which it discharges into said building;

said gravel body being in thermal contact with said earthen surface; and a liner of thermally conductive and gas impermeable material between and in contact with said earthen surface and said gravel body, and between and in contact with said bottom surface and said gravel body, said liner enclosing said gravel to isolate it from said earthen surface and from said slab;

an air regulator in said building receiving air from said outlet part and discharging it into said building, said filter being disposed in said register;

an aperture formed through the sidewall of the building in fluid communication with said air register, a first set of lowers adapted to enable and to prevent flow of air into the building, a second set of louvers being formed in said aperture to divert air to the outside of the building, and apparatus to adjust the setting of said second louvers.

2. Apparatus according to claim 1 in which said edges adjoin said fluid path said liner isolating said path from said earthen surface.

3. In combination with a concrete slab laid above an earthen surface to form the floor of a building above it, said building including a roof and a peripheral sidewall, said slab having a top surface, a bottom surface, an inlet port and an outlet port through said slab from surface to surface spaced apart from one another;

a conditioning system for the air inside the building comprising: between said earthen surface and said bottom surface a body of gravel having an inlet edge and an outlet edge, said edges being separated from one another, said inlet edge being in fluid communication with said inlet port, and said outlet edge being in fluid communication with said outlet port, whereby a fluid path exists from said inlet port through said gravel body to said outlet port;

an air blower discharging air under pressure into said inlet port;

a filter receiving air from said outlet port and filtering said air which it discharges into said building;

said gravel body being in thermal contact with said earthen surface; and a liner of thermally conductive and gas impermeable material between and in contact with said earthen surface and said gravel body, and between and in contact with said bottom surface and said gravel body, said liner enclosing said gravel to isolate it from said earthen surface and from said slab, an air regulator in said building receiving air from said outlet port and discharging it into said building, said filter being disposed in said register;

an aperture formed through the sidewall of the building in fluid communication with said air register, a first set of lowers adapted to enable and to prevent flow of air into the building, a second set of louvers being formed in said aperture to divert air to the outside of the building, and apparatus to adjust the setting of said second louvers, the said inlet edge of said gravel body being adjoined by a plenum extending from said inlet port, and a second plenum adjoining said outlet edge leading to said outlet port, said plenums being lined by said liner to separate them from the earthen surface.

4. In combination with a concrete slab laid above an earthen surface to form the floor of a building above it, said building including a roof and a peripheral sidewall, said slab having a top surface, a bottom surface, an inlet port and an outlet port through said slab from surface to surface spaced apart from one another;

a conditioning system for the air inside the building comprising: between said earthen surface and said bottom surface a body of gravel having an inlet edge and an outlet edge, said edges being separated from one another, said inlet edge being in fluid communication with said inlet port, and said outlet edge being in fluid communication with said outlet port, whereby a fluid path exists from said inlet port through said gravel body to said outlet port;

an air blower discharging air under pressure into said inlet port;

a filter receiving air from said outlet port and filtering said air which it discharges into said building;

said gravel body being in thermal contact with said earthen surface; and a liner of thermally conductive and gas impermeable material between and in contact with said earthen surface and said caravel body, and between and in contact with said bottom surface and said gravel body, said liner enclosing said gravel to isolate it from said earthen surface and from said slab, an air regulator in said building receiving air from said outlet port and discharging it into said building, said filter being disposed in said register;

an aperture formed through the sidewall of the building in fluid communication with said air register, a first set of lowers adapted to enable and to prevent flow of air into the building, a second set of louvers being formed in said aperture to divert air to the outside of the building, and apparatus to adjust the setting of said second louvers;

a pair of said gravel bodies and outlet ports being provided, with a common plenum between them; and said inlet edge of said gravel body being adjoined by a plenum extending from said inlet port, and a second plenum adjoining said outlet edge leading to said outlet port, said plenums being lined by said liner to separate them from the earthen surface.

5. Apparatus according to claim 4 in which said edges adjoin said fluid path said liner isolating said path from said earthen surface.

* * * * *